United States Patent [19]

Menegaz et al.

[11] 4,095,935
[45] Jun. 20, 1978

[54] FURNACE WITH PLENUM ARCHES

[75] Inventors: Denis A. Menegaz, Houston, Tex.; Elmars Blumenaus, San Francisco, Calif.; Richard Estile H. Ray, Houston, Tex.

[73] Assignee: Pullman Incorporated, Chicago, Ill.

[21] Appl. No.: 679,525

[22] Filed: Apr. 23, 1976

[51] Int. Cl.² .............................................. F23D 11/02
[52] U.S. Cl. ..................................... 431/167; 110/331; 431/174; 431/180
[58] Field of Search ............... 431/174, 178, 179, 180, 431/167; 110/99 R; 432/238; 23/277 R, 166

[56] References Cited

U.S. PATENT DOCUMENTS

| 1,720,941 | 7/1929 | Booraem | 110/99 R |
| 2,278,189 | 3/1942 | Barnes | 432/238 X |
| 2,672,191 | 3/1954 | Campbell et al. | 431/178 |
| 2,806,516 | 9/1957 | Brola | 431/174 X |

*Primary Examiner*—Edward G. Favors
*Attorney, Agent, or Firm*—Kurt S. Myers; C. W. Crady, Jr.

[57] ABSTRACT

An improved furnace design for carrying out the catalytic steam reforming of hydrocarbons, including an air delivery and burner system which extends across the top of the furnace. The air delivery system includes a plurality of air ducts each forming a plenum arch, with the arches being suspended between their respective ends as they span the top of the furnace. Burners, for providing heat to the radiant section of the furnace, are spaced within each of such arches and extend into the furnace. Further, the plenum arches provide a supporing structure for the insulation forming the top the radiant section of the furnace.

12 Claims, 6 Drawing Figures

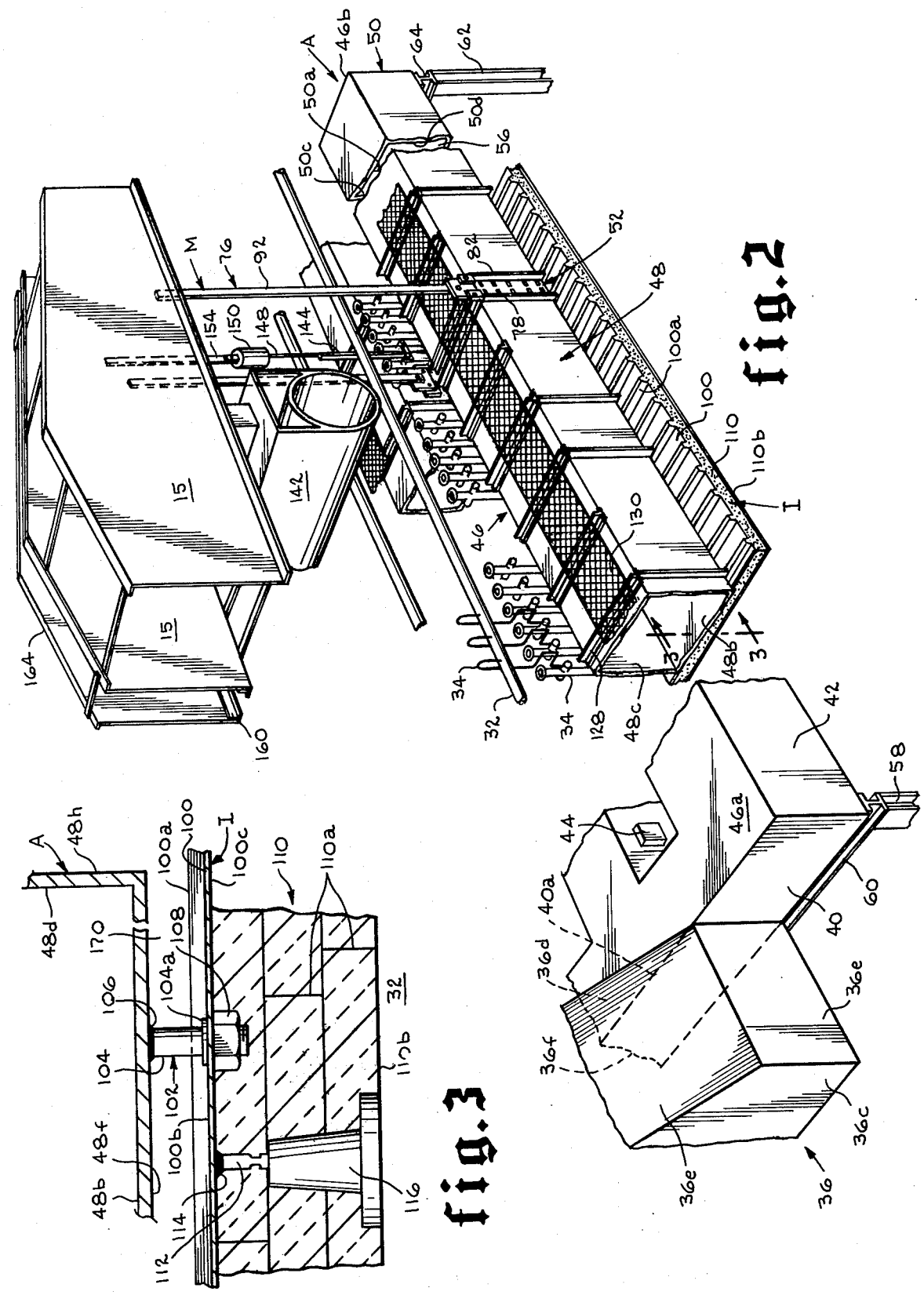

4,095,935

FURNACE WITH PLENUM ARCHES

BACKGROUND OF THE INVENTION

The present invention is directed to an improved furnace design, specifically to an air delivery and burner system which extends across the top of a furnace used for the catalytic steam reforming of hydrocarbons.

Previous designs for catalytic steam reforming furnaces used brick to form the top of the radiant section of such a furnace. In addition to the conventional arch steel, the brick required steel suspensions for support. Further, previous designs employing air preheat generally utilized overhead ducting, with take-offs to each burner, resulting in a hot and noisy penthouse above the brick floor, i.e. the top of the radiant section of the furnace. This design resulted in a congested, noisy, and hot area above the radiant section of the furnace. Further, coupled with this congestion and heat at the operator level, a personnel hazard existed in the event of mechanical failure of the bricks resulting in high temperature openings in the arch, flash back of flames through the burner intake ports and/or loss of draft causing hot gases generally to rise by convection through the arch.

A catalytic steam reforming furnace of previous design is disclosed in U.S. Pat. No. 3,257,172.

SUMMARY OF THE INVENTION

The present invention relates to a new and improved air delivery and burner system for use in a furnace for the catalytic steam reforming of hydrocarbons. The air delivery and burner system of the present invention extends across the top of the furnace and includes a plurality of air ducts suspended between its ends and adapted to receive preheated air, each of such ducts forming a plenum arch having burners spaced within each of such arches extending downwardly into the radiant section of the furnace.

BRIEF DESCRIPTION OF THE DRAWINGS

FIG. 2 is an enlarged, isometric view, partly in section, of a portion of the furnace of FIG. 1 showing the plenum arch of the present invention;

FIG. 3 is an elevational, sectional view of the plenum arch and insulation support deck with insulation of the present invention, taken along the lines 3—3 of FIG. 2;

DESCRIPTION OF THE PREFERRED EMBODIMENT

Figure 1:
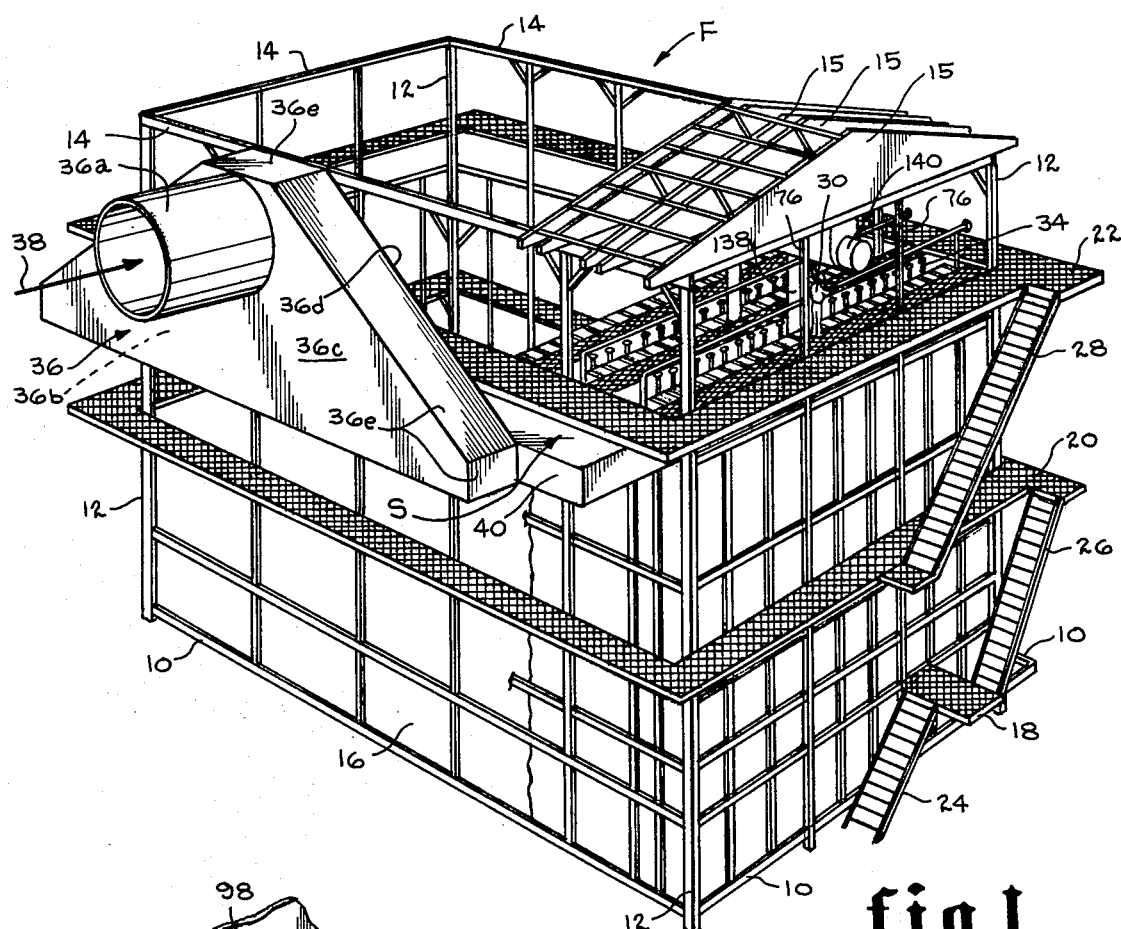
FIG. 1 is an isometric view of a furnace incorporating the air delivery and burner system of the present invention.

In the drawings, the letter S designates the air delivery and burner system of the present invention. The system S includes plenum arches A having burners B mounted therein, with the plenum arches A being suspended from the furnace F by suspension means M. Unless otherwise noted, the components of this invention are made of steel capable of taking heavy stresses and strains without failure, although other suitable high-strength materials may be used if desired.

As shown in FIG. 1, the system S of the present invention is adapted to be used with a furnace F preferably used in the catalytic steam reforming of hydrocarbons. The furnace F includes a number of structural members, including base members 10, vertical members 12, and upper members 14. Members 10, 12, 14 define the generally box-shaped configuration of the furnace F, noting that there are numerous intermediate framing and support members (not numbered) in the overall construction of the furnace F. A plurality of roof trusses 15 extending between and which are mounted on one pair of upper members 14 provide the roof structure of the furnace F. The walls 16 of the furnace F may be made of any suitable insulating material, be it a ceramic brick or of a blanket-type ceramic fiber, or any other suitable type of thermally insulative material. Platform 18 and catwalks 20, 22 as connected by stairways 24, 26, 28, respectively, provide for access to the upper portions of the furnace F by an operator 30 for maintenance and operational control of the furnace F.

The interior portion of the walls 16 (not shown) defines the radiant portion 32 (FIG. 5) of the furnace F. The radiant portion 32 of the furnace F is adapted to receive a plurality of vertically disposed catalyst tubes 34 which are arranged in rows, each row having multiple tubes 34, the function of which will be more fully discussed hereinbelow.

The system S of the present invention includes plenum arches A for directing preheated air to the burners B for combustible heating of the catalyst tubes 34 within the radiant portion 32 of the furnace F. Appropriate preheating means (not shown) preheats and forces the incoming air under pressure into air inlet means such as air feed chamber 36 in the direction of arrow 38. The air feed chamber 36 includes inlet connector 36a as mounted and in flow communication with a generally triangularly-shaped chamber portion 36b as defined by generally triangularly-shaped side walls, 36c, 36d and appropriate perimeter walls 36e joining walls 36c, 36d. Preferably, the inlet connector 36a is affixed to side wall 36c adjacent the uppermost portion thereof for directing the preheated air in the direction of arrow 38 into chamber portion 36b. The general triangular shape of the air feed chamber 36 promotes distribution of the incoming preheated air towards the base portion of the chamber portion 36b.

The air feed chamber 36 is mounted with distributor means such as distributor 40 (FIGS. 1, 2). The distributor 40 is in flow communication with the air feed chamber 36 due to opening 36f formed in air feed chamber 36 which corresponds to a similar opening 40a formed in the distributor 40. The distributor 40 directs the preheated incoming air into the air ducts or plenum arches A of the present invention. The amount of preheated air received in each of such arches A is regulated by dampers 42 (FIG. 2) mounted within the plenum arches A adjacent the connection with distributor 40 for regulating and balancing the air flow therewithin such plenum arches A. Regulation of the dampers 42 may be accomplished by any known control device, such as a control motor 44, for adjusting the proper volumetric amount of air flowing within such arches A.

Figures 4, 6:
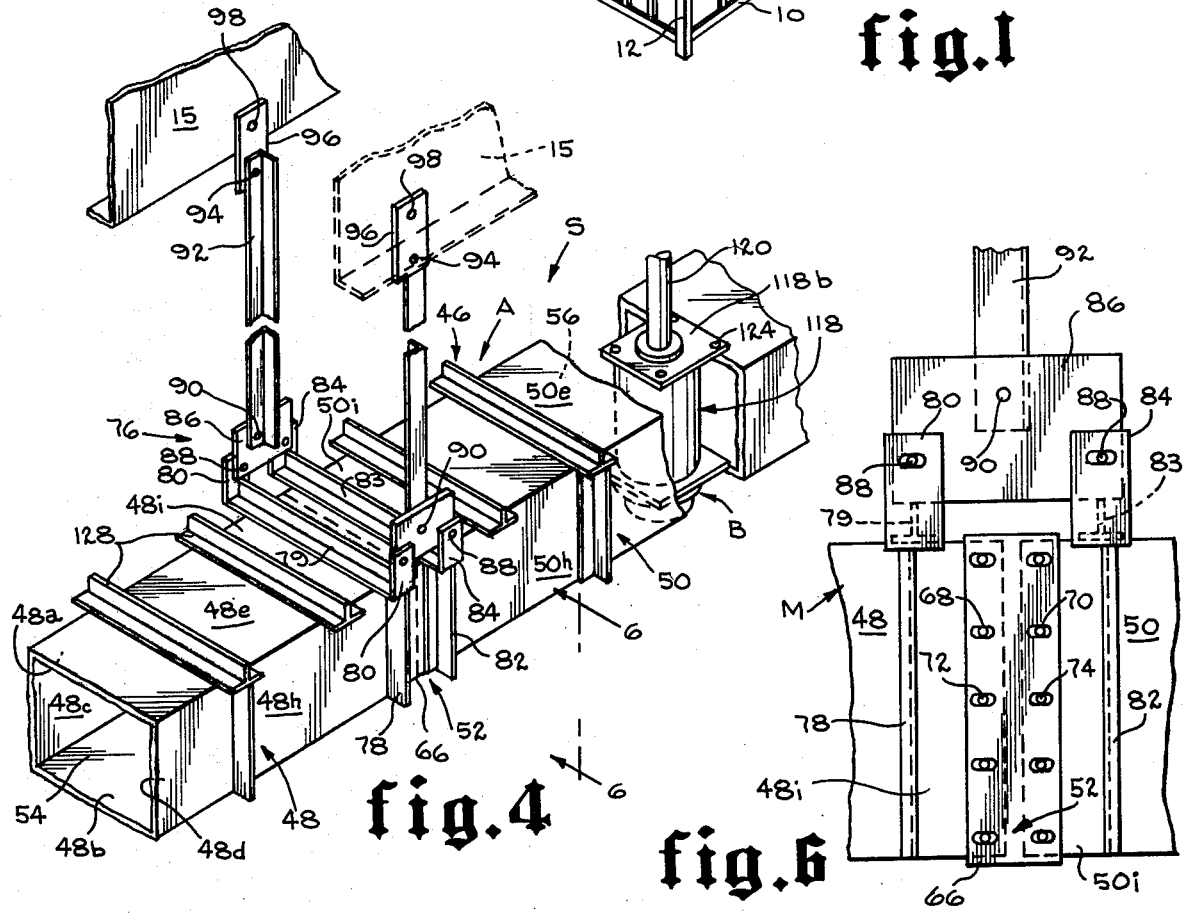
FIG. 4 is an enlarged, isometric view of the plenum arch showing the suspension system for supporting the arches of the present invention.
Figure 5:
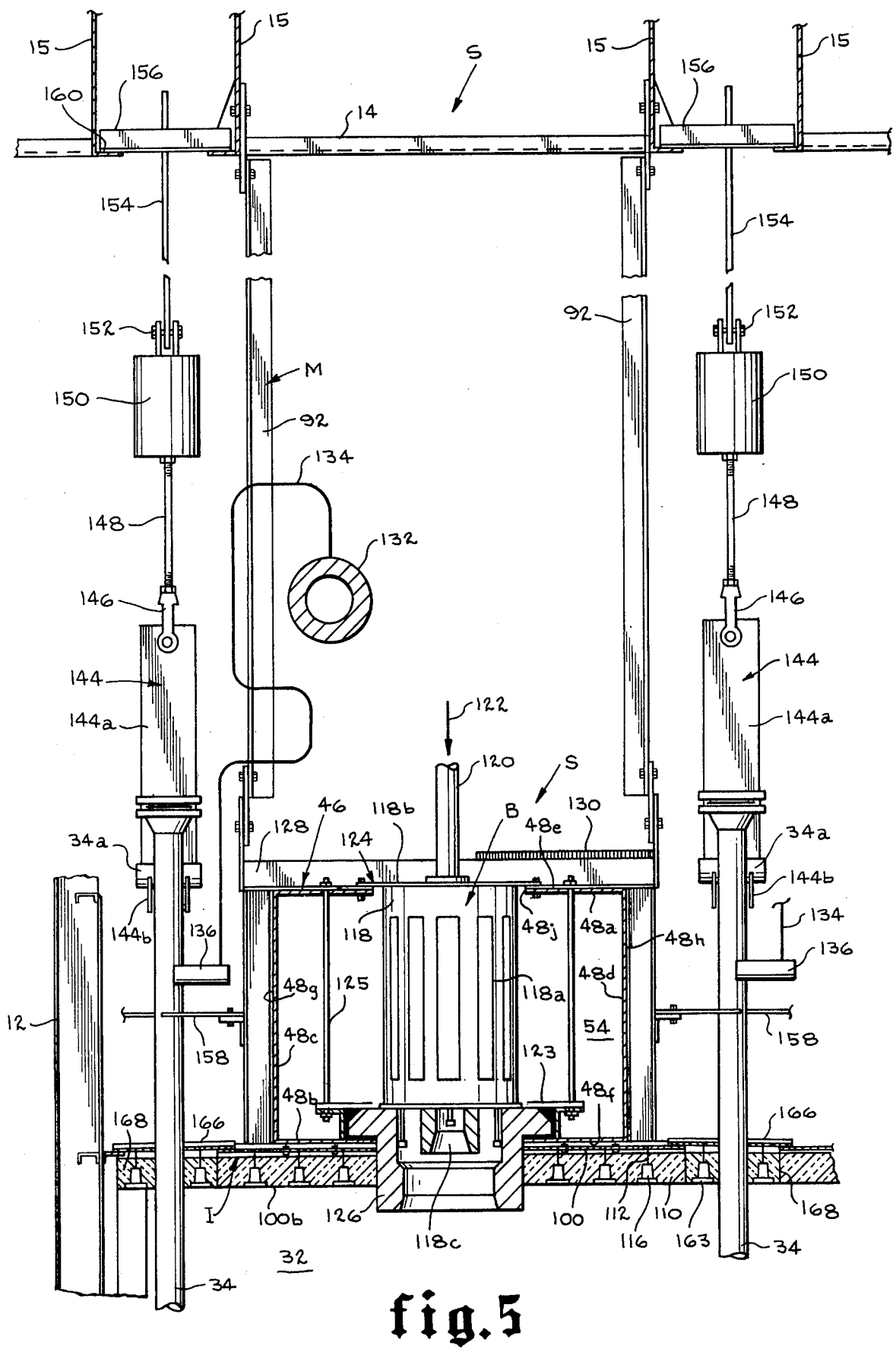
FIG. 5 is a sectional, elevational partly schematic view of the plenum arch and burner system of the present invention as used with a furnace for the catalytic steam reforming of hydrocarbons; and, FIG. 6 is an elevational view of a portion of the suspension means of the present invention as taken along the lines 6—6 of FIG. 4.

The air delivery and burner system S of the present invention includes a plurality of plenum arches A extending across the top of the furnace F, all being substantially identical. More particularly, air duct or arch 46 is typical of such plenum arches A. For simplicity, two arches A are shown in FIG. 1, however, the furnace F is preferably to have plenum arches A spanning the width along its entire length. As shown in FIGS. 2, 4 and 5, arch 46 is elongate having a general rectangular, cross-sectional configuration, however, any other suitable cross-sectional configuration may be used if desired. Preferably, arch 46 is composed of plural sections such as sections 48, 50 as joined theretogether by connection means 52 described more fully hereinbelow.

Sections 48, 50 will be discussed in full detail hereinbelow as representatives of all plenum arches A of the present invention. Each of the sections 48, 50 have inner surfaces 48a-48d, 50a-50d defining interior chambers 54, 56, respectively, and exterior surfaces 48e-48h, 50e--50h, respectively, (FIGS. 4, 5). Preferably, the sections 48, 50 of arch 46 are formed of carbon steel plate, however, any other suitable material may be used. The plenum arches A are affixed at one end 46a to the distributor 40 supported in part by support members 58, 60 (FIG. 2) and supported adjacent the other end 46b in part by support members 62, 64. Both the distributor 40 and the end 46b of the arch 46 rest upon but are not rigidly affixed to their respective horizontal support members 60, 64 allowing for expansive and contractive movement of the arch 46 in response to heating and cooling thereof.

It is preferred that the arch 46 be of three sections being joined by connection means 52 therebetween adjacent sections as shown in FIGS. 2, 4, 6. The connection means 52 includes a collar 66 adapted to conform to the outer perimeter of the duct 46 having a plurality of slotted holes 68, 70 formed therein. A suitable heat resistant sealing material (not shown) is preferably mounted between the inner surface of the collar 66 and the outer surface of the duct 46 to prevent leakage of the preheated air. Slotted holes 68 match and conform with similarly formed holes (not shown) adjacent end 48i in section 48 while slotted holes 70 conform to similar holes (not shown) formed in section 50 adjacent end 50i. Bolts 72, 74 are inserted through slotted holes 68, 70, respectively, and corresponding holes in sections 48, 50 to provide for a movable connection for adjoining arch sections 48, 50. Inasmuch as bolts 72, 74 are snugly but rigidly fastened, sections 48, 50 may move longitudinally apart or closer together along the longitudinal axis of the arch A or may pivot either vertically or horizontally with respect to one another in response to thermal stresses. Thus, the collar-slotted, hole-bolted arrangement allows flexible movement of the sections 48, 50 to accommodate varying expansive and contractive movement of the arch sections in response to various thermal irregularities encountered in the operation of the furnace F.

As shown in FIGS. 4 and 6, end 48i of section 48 is adjacent end 50i of section 50, being connected therebetween by collar 66. The sections 48, 50 are supported adjacent this connections means 52 by suspension means M which includes hanger means 76. Hanger means 76 includes side support brackets 78, top support bracket 79 and tabs 80 mounted with section 48 adjacent end 48i and side support brackets 82, top support bracket 83, and tabs 84 mounted adjacent end 50i of section 50. Preferably, tabs 80, 84 are respectively mounted with top support brackets 79, 83, respectively, at each end thereof and adapted to be pivotally mounted with a pivotal mounting means such as pivot plates 86 by pins 88 or any other suitable pivotal fastening means. Pivot plates 86 are in turn pivotally connected with pins 90 to hanger rods 92 which in turn are pinned by pins 94, or any other suitable means, to hanger rod supports 96 affixed to upper members 15 by fasteners 98. Thus, sections 48, 50 of the arch 46 are pivotally suspended by suspension means M by pivot plates 86 pivotal affixation to tabs 80, 84 of sections 48, 50, respectively. This pinned, pivotal configuration allows full support of the adjacent ends 48i, 50i of sections 48, 50 while allowing freedom of movement and flexibility in the connection means 52 therebetween. Any expansive or contractive movement resultant to thermal differences within the plenum arches A is compensated by the pivotal connection means 52 of the suspension means M therebetween adjoining sections. Still further, due to the non-rigid connection adjacent the ends of the plenum arch A on support members 60, 64, coupled with the suspension means M, the entire arch A may expand upon heating or contract upon cooling either horizontally, vertically and/or longitudinally thus resulting in the movable suspension of the arches A.

The system S of the present invention further includes insulation support means I which is affixed to the bottom of each of the arches A. As shown in FIG. 3, the insulation support means I includes insulation support deck 100. Preferably, the insulation support deck 100 is of a light-gauge stainless sheet steel because of its corrosion and heat resistant characteristics. However, other suitable materials may be used. The insulation deck 100 has corrugations 100a (FIG. 2) for providing strength and flexibility during expansion thereof. The insulation support deck 100 is preferably affixed to the plenum arches A, such as arch 48 by attachment means 102 which includes bolts 104 affixed to bottom surface 48f of section 48 by weldment 106. The bolt 104 has an appropriate stop 104a for engaging the upper surface 100b of the insulation support deck 100. Nut 108 is threadedly affixed to the threaded portion of bolt 104 thus securely engaging the insulation support deck 100. This bolted configuration is preferred because to weld the insulation support deck to the section 48 would result in an undesirable bimetallic weld being subjected to unwanted thermal stresses.

Insulation 110, preferably of a blanket-type ceramic fiber insulative material, is affixed to the bottom surface 100c of the insulation support deck 100 by anchors 112 which are welded to the bottom surface 100c of insulation support deck 100 by weldments 114 whereinafter ceramic retainers 116 receive the anchors 112 for securing the insulation 110 thereto the insulation support deck 100. Ceramic putty (not shown) is used to set the anchor 112 with respect to the retainer 116 to prevent vibrative separation of the retainer 116 from the anchor 112. Preferably, the blankets of insulation 110 are wrapped such that the insulation edges 110a are staggered in such a fashion to prevent thermal leakage therebetween the multiple layers thereof. The base face 110b of the insulation 110 forms the uppermost portion for the radiant portion 32 of the furnace F. Thus, no ceramic bricks are used to define the roof of the radiant portion 32 of the furnace F, but rather, insulation 110 as affixed to the insulation support deck 100 forms a continuously insulated top portion for the radiant portion 32. As will be appreciated, the insulation support deck 100 and insulation 110 attached thereto is suspended entirely by the plenum arches A of the present invention and may respond expansively or contractively to varying temperature conditions existing within the radiant portion 32 of the furnace F. While only the base face 110b of the insulation 110 and the ceramic retainers 116 are exposed to the heat within the radiant portion 32 of the furnace F, the space above insulation support deck 100 and the plenum arches A of the present invention, i.e. the penthouse of furnace F is insulated, resulting in no direct contact of metal support members to the radiant heat of the furnace F.

The air delivery and burner system S of the present invention further includes burners B adapted to be mounted within the plenum arches A extending downwardly into the furnace F. The burners B may be fired with gas, oil, or a combination thereof, and are adapted to be disposed in rows within the plenum arches A of the present invention. The burners B include burner 118, as shown in FIG. 5, being mounted within section 48 of arch 46. The burner 118 includes intake ports 118a for receiving the preheated air flowing in the arch A. Fuel line 120 is attached to plate 118b of the burner 118 for providing fuel, be it gas or oil or any combination thereof for firing within the furnace F. Fuel enters in the direction of arrow 122 through fuel line 120 and mixes with preheated air induced into the burner 118 through intake ports 118a into a combustible mixture at nozzle 118c resulting in a combustible discharge into the radiant portion 32 of the furnace F. The burner 118 is mounted within the section 48 from the top through an opening 48j formed in the top surface 48a, 48e of the section 48 and affixed thereto by fasteners 124. The burner 118 rests in a ceramic burner block 126 for proper orientation of the burner 118 with respect to the section 48 of the arch 46 with the block 126 being located and positioned by plate 123 and rods 125. Thus, the burners B are mounted downwardly through the top portion in the arch 46 and extend into the radiant portion 32 of the furnace F. This mounting configuration is substantially different from the prior art air preheat furnaces which utilized overhead ducting with individual take-offs to each burner resulting in congestion at the operator level plus increased ambient air temperature around the penthouse area, all adding to increased safety risks for those operating in the vicinity thereof.

The arches 46 of the present invention further include arch stiffeners 128 for providing added strength to the arches A such that a grading or platform 130 may be appropriately mounted thereon for aiding in accessibility of the various components by the operator. The platform 130 spans the length of the arches A and extends therebetween adjacent catwalks 22 located about the upper perimeter of the furnace F.

As shown in FIG. 5, the furnace F as used in the catalytic steam reformation of hydrocarbons includes a number of further associated elements which are described briefly hereinbelow. Inlet manifold 132 introduces fluid reactants through flexible hoses or pigtails 134 into tube manifold 136 for catalyst tube 34. It will be appreciated that one inlet manifold 132 services an entire row of catalyst tubes 34 with each of such tubes having its own tube manifold 136 and pigtail 134. Each of the tubes 34 is adapted to contain catalysts and members receive fluid reactants flowing into its upper end. Suitable catalyst support means such as grids (not shown) are affixed within each tube 34 adjacent its lower end (not shown) to support a column of catalysts and to permit flow of fluid products from the tubes 34 without loss of catalyst. Fluid products from the catalyst tubes 34 are collected by risers 138 (FIG. 1) and directed into a transfer means such as effluent chamber 140, supported by effluent chamber mount 142 (FIG. 2) which is mounted with the upper membrs 15 of the furnace F. The effluent chamber 140 directs the fluid products of the reaction outwardly from the furnace F to thereafter be further reformed and/or used in any fashion so desired.

Catalyst tubes 34 have flanges 34a mounted therewith to be engaged by hangers 144 for supporting the catalyst tube 34 during the use and operation thereof. The hangers 144 include a vertically disposed portion 144a and pivotally pinned supports 144b which engage flanges 34a. Preferably, the hangers 144 support two catalyst tubes 34 at the same time with the pivotal relationship of the supports 144b and portion 144a allowing for elevational variations due to different rates of expansion and contraction for the adjacent catalyst tubes 34. The hangers 144 have couplers 146 for threadedly engaging rod 148 which in turn engages spring 150. Spring 150 is pivotally mounted by pin 152 to member 154 to upper support block 156 for the proper support thereof. The spring 150, various pinned and threaded connections all enhance the movable nature of support necessary for such catalyst tubes 34 inasmuch as such tubes 34 encounter enormous elongation due to the tremendous temperature differentials encountered within the radiant portion 32 of the furnace F. Guides 158 provide for horizontal and vertical alignment of adjacent catalyst tubes 34. It will be appreciated that support blocks 156 support the entire catalyst tube 34 and supporting assembly and are mounted in channels 160 attached to roof trusses 15 which are mounted on the upper members 14 of the furnace F. Removable roof panels 164 (FIG. 2) are bolted to the trusses 15. Should it be desired to replace and/or remove a catalyst tube 34, the roof panel 164 need only be unbolted and the entire catalyst tube 34 and assembly removed by engaging block 156 and lifting upwardly thereon. Thus, the catalyst tube 34 is lifted vertically between the roof trusses and out of the furnace F. During such removal operation, the seal plate 166 (FIG. 5), which conforms to the corrugated configuration of the insulation support deck 100 as well as the seal plate insulation 168 therewith must be removed for proper extraction of the catalyst tube 34. Preferably, the seal plate 166 conforms to the corrugations in the insulation support deck as well as thereabout the adjacent perimeter of the catalyst tube 34. An anchor-ceramic retainer assembly 163 like anchor 112 and retainer 116 secure the seal plate insulation 168 to the seal plate 166. Thus, upon removal of the catalyst tube 34, the insulation immediately adjacent thereto is removable to prevent damage to such insulation 168 about that portion which engages the exterior of the catalyst tube 34, thus reducing the chance of damage to the insulation 168 during the removal process. Alternatively, when seal plate 166 and insulation 168 are properly positioned, no exposed areas are manifest wherein thermal leakage may occur, which could potentially be a hazard to those working in the adjoining areas.

In the use and operation of the air delivery and burner system S of the present invention, it will be appreciated that each burner row is externally insulated by the insulation 110. Further, a gap 170 (FIG. 3) exists between the insulation support deck 100 and the bottom exterior surface 48f of section 48 providing for a further insulative feature. The insulation support deck 100 and insulation 110 therewith forms the top or roof of the radiant portion 32 of the furnace F. The insulation support deck 100 forms a continuous insulative sheet that may freely expand and contract with the expansion and contraction of the plenum arches A of the present invention. Further, all joints in the insulation support deck 100 are overlapped occurring at the corrugations 100a themselves to effect a positive thermal seal. It will be appreciated that an operator 30 working in the vicinity thereof will have a much cleaner arch level area due to the reduced congestion and further have essentially three steel layers between himself and the radiant portion 32 of the furnace F, that is, the insulation support deck 100, and the bottom and top portions of the plenum arches A. Inasmuch as there are no individual ceramic tiles, isolated mechanical failure, causing openings in the arch, do not exist. Further, if any flashback of flames through the burner air intake ports 118a should occur, this flashback would take place in the air preheat duct, insulating the operator 30 from any potential harm therefrom. Still further, any blowback of hot gases through the arch A due to the temporary loss of draft has considerably more thermal and mechanical resistance due to the configuration of the system S of the present invention resulting in reduced temperature at operator level. Still further, the platform 130 is now further away from the arch level which further adds to the safety.

Mounting of the burners B within the plenum arches A offers the additional advantage of reducing noise transmitted from the burners B because the burners B are totally enclosed within the arch A, which will result in quieter penthouse area.

Thus, the system S of the present invention includes plenum arches A having burners B mounted therein from the top thereof and extending into the furnace F. The arches A are suspended in order to expand and contract in response to thermal influences from the radiant portion 32 of the furnace F. Further, the preheated inlet air system floats, that is, the entire plenum arch A-burner B insulation support means I assembly can move in response to any thermal gradients.

The foregoing disclosure and description of the invention are illustrative and explanatory thereof, and various changes in the size, shape and materials as well as in the details of the illustrated construction may be made without departing from the spirit of the invention.

We claim:

1. An air delivery and burner system for a furnace which comprises:
    air inlet means for receiving preheated inlet air;
    a plurality of air ducts extending across the top of said furnace, each air duct forming a plenum arch,
    each plenum arch extending from said air inlet means and adapted to receive preheated air from said air inlet means and supported at each end;
    suspension means mounted with the furnace for suspending each of said plenum arches between said ends; and
    burners spaced within each of said plenum arches extending downwardly into the furnace.

2. A system according to claim 1, which further includes:
    air distribution means mounted with said plenum arches and said air inlet means for distributing air from said air inlet means to each of said plenum arches.

3. A system according to claim 2, which further includes:
    damper means mounted adjacent said air distribution means in each of said arches for regulating the proper air flow within said arches to insure proper combustion within said burners.

4. A system according to claim 1, wherein each arch is externally insulated.

5. A system according to claim 1, which further includes:
    insulation supporting means attached to the bottom of each of said arches for supporting furnace insulation.

6. A system according to claim 5, wherein:
    said furnace insulation is of a blanket-type ceramic fiber.

7. A system according to claim 5, wherein:
    said insulation supporting means is corrugated sheet metal.

8. A system according to claim 5, wherein said insulation supporting means includes:
    attachment means for attaching said insulation supporting means to the bottom of each of said arches and providing a gap between said arch and said supporting means.

9. A system according to claim 1, wherein said suspension means further includes:
    means for movably connecting said air ducts adjacent one another and movably mounted with said adjacent air ducts for allowing relative movement between adjacent air ducts during expansive and contractive movement of said arches due to heating and cooling thereof.

10. A system according to claim 9, wherein said suspension means includes:
    pivotal mounting means mounted with said adjacent air ducts for allowing pivotally expansive and contractive movement of said arches in response to heating and cooling thereof.

11. An air delivery and burner system for a furnace which comprises:
    a plurality of air ducts extending across the top of said furnace and supported at each end, each forming a plenum arch
    suspension means mounted with the furnace for supporting each of said arches between said ends;
    insulation supporting means which comprises corrugated sheet metal attached to the bottom of each of said arches forming the top of the radiant section of the furnace; and
    burners spaced within each of said arches extending downwardly into said radiant section of the furnace.

12. wherein: air delivery and burner system according to claim 11, wherein;
    said insulation supporting means includes attachment means for attaching said insulation supporting means to the bottom of each of said arches by providing a gap between said arch and said insulation supporting means.

* * * * *